United States Patent
Vantomme et al.

(10) Patent No.: US 8,911,872 B2
(45) Date of Patent: *Dec. 16, 2014

(54) BIMODAL POLYETHYLENE

(71) Applicant: Total Research & Technology Feluy, Seneffe (Feluy) (BE)

(72) Inventors: Aurélien Vantomme, Bois-de-Villers (BE); Daniel Siraux, Naast (BE); Alain Van Sinoy, Chastre (BE); Jean-Léon Gielens, Seneffe (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,702

(22) Filed: Jun. 9, 2014

(65) Prior Publication Data

US 2014/0288258 A1   Sep. 25, 2014

Related U.S. Application Data

(63) Continuation of application No. 14/060,779, filed on Oct. 23, 2013, now Pat. No. 8,802,210, which is a continuation of application No. 13/522,761, filed as application No. PCT/EP2011/051767 on Feb. 7, 2011, now Pat. No. 8,609,792.

(30) Foreign Application Priority Data

Feb. 5, 2010  (EP) ..................................... 10152827
Jul. 30, 2010  (EP) ..................................... 10171373

(51) Int. Cl.
*B32B 27/00* (2006.01)
*C08F 110/02* (2006.01)

(52) U.S. Cl.
CPC ................................... *C08F 110/02* (2013.01)
USPC ......................................... 428/500; 525/240

(58) Field of Classification Search
USPC ........................................ 428/500; 525/240
See application file for complete search history.

*Primary Examiner* — Michael C Miggins

(57) ABSTRACT

The invention relates to A process for the polymerization of ethylene to produce a polyethylene resin in at least two slurry loop reactors connected to each other in series, the resin having a bimodal molecular weight distribution, a molecular weight distribution MWD of at least 7.0, an HLMI of from 1 to 100 g/10 min, and a density of from 0.935 to 0.960 g/cm$^3$,
wherein in one reactor 30 to 47 wt % based on the total weight of the polyethylene resin of a high molecular weight (HMW) polyethylene fraction is produced having an HL275 of from 0.05 to 1.8 g/10 min (the equivalent of HLMI of from 0.01 to 1.56 g/10 min), a density of from 0.925 to 0.942 g/cm$^3$ and an MWD of at least 5.0,
and in the other reactor a low molecular weight (LMW) polyethylene fraction is produced having an HLMI of from 10 to 1500 g/10 min and a density of from 0.960 to 0.975 g/cm$^3$,
in the presence of a Ziegler-Natta catalyst system.

13 Claims, No Drawings

BIMODAL POLYETHYLENE

CROSS-REFERENCE TO RELATED APPLICATIONS

This application is a Continuation of U.S. application Ser. No. 14/060,779, filed on Oct. 23, 2013, which is a Continuation of U.S. application Ser. No. 13/522,761, filed on Sep. 28, 2012, now issued as U.S. Pat. No. 8,609,792, which claims the benefit of PCT/EP2011/051767, filed on Feb. 7, 2011, which claims priority from EP 10152827.1, filed on Feb. 5, 2010, and EP 10171373.3, filed on Jul. 30, 2010.

FIELD OF THE INVENTION

This invention relates to a process for polymerizing ethylene in the presence of a Ziegler-Natta catalyst system in two reactors in series to produce a polyethylene resin having a bimodal molecular weight distribution with a high extrudate swell and impact properties for blow-moulding applications. In particular, the invention relates to polyethylene resins suitable for making blow-moulded articles, such as open-head and tight-head drums, fuel tanks, and jerrycans.

BACKGROUND OF THE INVENTION

Polyethylene has desirable properties that have helped to make it the highest volume polymer manufactured. Ziegler-Natta catalysts are a mainstay for polyolefin manufacture and are used in slurry, solution, and gas-phase polymerizations. Certain applications, such as blow-moulding, require a careful balance of rheological properties, and there is a continuing effort to develop polyethylene with improved properties.

A property that is especially important for blow-molding applications is the extrudate swell. When a resin exhibits too little swell, it can become difficult or impossible to properly fill out the extremities of the mold, such as the handle of a blow-molded bottle.

Until recently, predicting extrudate swell of a particular resin was not a simple feat. In particular, identifying the relative effects of average mass and polydispersity on swell proved difficult, as shown by Doelder et al Journal of Non-Newtonian Fluid Mechanics 152 (2008) 195-202.

US 2008/0132640 predicts a high swell and high melt-strength using a Ziegler-Natta catalyst in two slurry loop reactors in series, whereby the ratio of the weight average molecular weight Mw of the high molecular weight fraction to Mw of the low molecular weight fraction is 8:1. However, the disadvantages of this process/produced polyethylene are that the Charpy impact resistance needs still to be improved for blow-moulding resins, in particular for applications such as tight-head drums.

Another possible solution is to crosslink the polyethylene in order to increase extrudate swell. For example, U.S. Pat. No. 5,486,575 improves the properties of a polyethylene resin prepared from a chromium catalyst by using an organic peroxide. U.S. Pat. No. 4,390,666 and U.S. Pat. No. 4,603,173 use peroxides to crosslink a polyethylene blend containing high and low molecular weight components. U.S. Pat. No. 6,706,822 discloses using peroxides with polyethylene having a broad molecular weight distribution to improve melt swell. U.S. Pat. No. 5,486,575 discloses using peroxides with polyethylene prepared with chromium catalysts. While some properties can be improved by crosslinking with peroxides, there are issues with this approach. The radicals produced can interact deleteriously with other additives. Furthermore, it is difficult to predict the effect of crosslinking on rheological properties. Reported results vary significantly from resin to resin, even when the resins are produced using similar catalyst technologies. Peroxides add an extra component to the composition, and they require careful handling and storage, which adds to the overall cost. It would be desirable to improve properties of a polyethylene resin for use in blow-moulding applications without using peroxides, since these generally induce lower impact properties.

Another approach to improve the rheological and mechanical properties of a polyethylene resin, disclosed in U.S. Pat. No. 4,336,352, U.S. Pat. No. 5,422,400, and U.S. Pat. No. 6,743,863, is to use blends containing three resin components. The blends can be made in a three-step polymerisation process. U.S. Pat. No. 4,336,352 states that mixtures of high and low molecular weight polyethylene (or blends produced by a multi-step polymerization process) have such a low die swell that blow-molded bottles of consistent quality are difficult to obtain. U.S. Pat. No. 5,422,400 states that earlier approaches with two-component mixtures have important limitations such as the need to use an ultrahigh molecular weight polyethylene having a minimum intrinsic viscosity. They overcome these limitations by using a three-step polymerization. Unfortunately, a three-component blend or a three-step polymerization is complicated and requires additional equipment. Polyethylene produced in two-step or even one-step polymerizations in the presence of Ziegler-Natta catalysts are generally known. For example, U.S. Pat. No. 6,878,454 teaches films prepared from bimodal polyethylene prepared using a variety of one stage and multistage processes. However, the polyethylene has a greater than 50% by weight fraction of the high molecular weight component.

Despite continued efforts to improve polyethylene properties for blow molding, there is a need for a process that can produce polyethylene with a high extrudate swell, but which does not require the extra equipment and complications of a three-step polymerization process. There is also a need to increase the extrudate swell and the charpy impact resistance of the polyethylene resin for certain blow-moulding applications, such as to produce tight-head drums. Finally, there is also a need to increase the extrudate swell, the charpy impact resistance and the ESCR for certain blow-moulding applications, such as to produce fuel tanks.

SUMMARY OF THE INVENTION

Process for the polymerisation of ethylene to produce a polyethylene resin in at least two slurry loop reactors connected to each other in series, preferably liquid full slurry loop reactors, and wherein the polyethylene resin has a bimodal molecular weight distribution, a molecular weight distribution MWD of at least 7.0, a high load melt index HLMI of from 1 to 15 g/10 min, and a density of from 0.940 to 0.960 g/cm$^3$, wherein in one reactor 30 to 47 wt % based on the total weight of the polyethylene resin of a high molecular weight (HMW) polyethylene fraction is produced having an high load melt index HL275 of from 0.05 to 1.8 g/10 min, a density of from 0.925 to 0.942 g/cm$^3$ and an MWD of at least 5.0 and in the other reactor a low molecular weight (LMW) polyethylene fraction is produced having an HLMI of from 10 to 1500 g/10 min and a density of from 0.960 to 0.975 g/cm$^3$, in the presence of a Ziegler-Natta catalyst system, the Ziegler-Natta catalyst preferably having a particle size distribution $d_{50}$ of from 4 to 12 μm, preferably 5 to 12 μm, more preferably 5 to 11 μm, most preferably 5 to 10 μm.

Most preferably the Ziegler-Natta catalyst system comprises a Ziegler-Natta catalyst, i.e. a Ziegler-Natta catalyst component D, and a preactivating agent, wherein the Ziegler Natta catalyst component D is obtainable by:
- a) generating a reaction product A by contacting a magnesium dialkoxide compound with a halogenating agent;
- b) contacting reaction product A with a first halogenating/titanating agent to form reaction product B;
- c) contacting reaction product B with a second halogenating/titanating agent to form reaction product C; and
- d) contacting reaction product C with a third halogenating/titanating agent to form catalyst component D.

The HL275 is measured as the HLMI, except that the die size is 2.75 mm instead of 2.05 mm. The HLMI can be calculated from the HL275 by:

HLMI=HL275/3.2

Preferably, the weight average molecular weight (Mw) of the HMW fraction is of from 500,000 to 1,000,000 Da.

Preferably, the process is carried out in two slurry loop reactors, at least one, preferably both, being liquid full slurry loop reactors.

Preferably, the HMW fraction is produced in the first reactor and the LMW fraction is produced in the second reactor.

The preactivating agent is preferably an organometallic preactivating agent. More preferably, the preactivating agent is an organoaluminum compound, preferably of the formula AlR3, wherein R is an alkyl having 1-8 carbon atoms or a halide, and wherein each R may be the same or different. More preferably, the organoaluminum compound is TEAL.

Preferably, the halogenating agent is ClTi(OPr)$_3$.

Preferably, the first halogenating/titanating agent a mixture of TiCl$_4$ and Ti(OBu)$_4$, in a molar ratio range of from 0.5:1 to 6:1 of TiCl$_4$/Ti(OBu)$_4$. More preferably the molar ratio is 2:1 of TiCl$_4$/Ti(OBu)$_4$.

Preferably, the second halogenating/titanating agent is TiCl$_4$.

Preferably, the third halogenating/titanating agent is also TiCl$_4$.

The invention also covers the polyethylene resin obtainable according to this polymerisation process having improved extrudate swell suitable for making jerrycans, open-head and tight-head drums, and fuel tanks.

At high weight average molecular weight i.e. preferably having an HLMI of from 1 to 4 g/10 min, the polyethylene resin according to the invention also has improved Charpy Impact resistance, suitable for making tight-head drums. Without being bound to theory, it is thought that the higher impact properties of this resin are due to the lower HLMI of the resin overall, but also thanks to the lower HLMI of the LMW fraction.

When the polyethylene resin according to the invention has an HLMI of greater than 4 g/10 min and a HMW fraction of 40 to 47 wt %, preferably 42 to 46 wt %, the resin has improved extrudate swell, improved Charpy Impact resistance and improved ESCR, suitable for making fuel tanks.

The invention also covers the blow-moulded articles prepared from the polyethylene resin according to the invention. In particular, the blow-moulded articles are containers. More in particular, the containers are jerrycans, open-head and tight-head drums, and fuel tanks.

DETAILED DESCRIPTION OF THE INVENTION

Ziegler-Natta Catalyst System

The invention is a process for polymerizing ethylene in the presence of a Ziegler-Natta catalyst system.

By "Ziegler-Natta catalyst system," we mean a Ziegler-Natta catalyst in combination with a preactivating agent.

By "Ziegler-Natta catalyst component" or "Ziegler-Natta catalyst" we mean a transition metal compound that incorporates a Group 4-8 transition metal, preferably a Group 4-6 transition metal, and one or more ligands that satisfy the valence of the metal. The ligands are preferably halide, alkoxy, hydroxy, oxo, alkyl, and combinations thereof. Ziegler-Natta catalysts exclude metallocenes or other single-site catalysts.

It is thought that the Ziegler-Natta catalyst used in the process of this invention without being bound to theory has the effect that the resin has an overall higher molecular weight (i.e. higher extrudate swell) without affecting the low molecular weight tailing (i.e. better impact properties). In this case, the Ziegler-Natta catalyst has a particle size distribution d50 of from 4 to 12 μm, preferably 4 to 12 μm, more preferably 5 to 11 μm, most preferably 5 to 10 μm. The catalyst's particle size distribution (PSD) d50 is measured by laser diffraction analysis on a Malvern type analyser (e.g. Malvern 2000S) after having put the catalyst in suspension in cyclohexane. The particle size distribution d50 is defined as the particle size for which fifty percent by volume of the particles has a size lower than the d50.

The present invention provides a polymerisation process wherein the catalyst is made according to a process comprising the following steps: a) contacting a magnesium dialkoxide compound with a halogenating agent to form a reaction product A; b) contacting reaction product A with a first halogenating/titanating agent to form reaction product B; c) contacting reaction product B with a second halogenating/titanating agent to form reaction product C; and d) contacting reaction product C with a third halogenating/titanating agent to form reaction product D, the Ziegler-Natta catalyst. The second and third halogenating/titanating agents can comprise titanium tetrachloride. The second and third halogenating/titanating steps can each comprise a titanium to magnesium ratio in the range of about 0.1 to 5. The reaction products A, B and C can each be washed with a hydrocarbon solvent prior to subsequent halogenating/titanating steps. The reaction product D can be washed with a hydrocarbon solvent until titanium species [Ti] content is less than about 100 mmol/L.

The catalyst system used in the present invention provides a polyolefin catalyst produced by a process generally comprising contacting a catalyst, such as the reaction product D above, together with a preactivating agent, for example an organometallic compound, preferably an organoaluminum compound.

The catalyst system used in the invention can have a fluff morphology amenable to polymerization production processes, and can provide a polyethylene having a molecular weight distribution of at least 5 and can provide uniform particle size distributions. The activity of the catalyst is dependent upon the polymerization conditions. Generally the catalyst will have an activity of at least 5,000 gPE/g catalyst, but the activity can also be greater than 50,000 gPE/g catalyst or greater than 100,000 gPE/g catalyst.

According to a preferred embodiment of the invention, a method for making a catalyst component generally includes the steps of forming a metal dialkoxide from a metal dialkyl and an alcohol, halogenating the metal dialkoxide to form a reaction product, contacting the reaction product with one or more halogenating/titanating agent in three or more steps to form a catalyst component, and then treating the catalyst component with a preactivation agent such as an organoaluminum.

Preferably the Ziegler-Natta catalyst used in this invention can be obtained generally as follows:

$$MRR'+2R''OH \rightarrow M(OR'')_2 \qquad 1.$$

$$M(OR'')_2+ClAR'''_x \rightarrow \text{"A"} \qquad 2.$$

$$\text{"A"}+TiCl_4/Ti(OR'''')_4 \rightarrow \text{"B"} \qquad 3.$$

$$\text{"B"}+TiCl_4 \rightarrow \text{"C"}; \qquad 4.$$

$$\text{"C"}+TiCl_4 \rightarrow \text{"D"} \qquad 5.$$

$$\text{"D"}+\text{preactivating agent} \rightarrow \text{catalyst} \qquad 6.$$

In the above formulas, M can be any suitable metal, usually a Group IIA metal, typically Mg. In the above formulas, R, R', R'', R''', and R'''' are each independently hydrocarbyl or substituted hydrocarbyl moieties, with R and R' having from 1 to 20 carbon atoms, generally from 1 to 10 carbon atoms, typically from 2 to 6 carbon atoms, and can have from 2 to 4 carbon atoms. R'' generally comprises from 3 to 20 carbon atoms, R''' generally comprises from 2-6 carbon atoms, and R'''' generally comprises from 2-6 carbon atoms and is typically butyl. Any combination of two or more of R, R', R'', R''', and R'''' can be used, may be the same, or the combination of the R groups may be different from one another.

In the above embodiment comprising formula ClAR'''$_x$, A is a nonreducing oxyphilic compound which is capable of exchanging one chloride for an alkoxide, R''' is a hydrocarbyl or substituted hydrocarbyl, and x is the valence of A minus 1. Examples of A include titanium, silicon, aluminum, carbon, tin and germanium, typically is titanium or silicon wherein x is 3. Examples of R''' include methyl, ethyl, propyl, isopropyl and the like having 2-6 carbon atoms. Nonlimiting examples of a chlorinating agent that can be used in the present invention are ClTi(O$^i$Pr)$_3$ and ClSi(Me)$_3$.

The metal dialkoxide of the above embodiment is chlorinated to form a reaction product "A". While the exact composition of product "A" is unknown, it is believed that it contains a partially chlorinated metal compound, one example of which may be ClMg(OR'').

Reaction product "A" is then contacted with one or more halogenating/titanating agent, such as for example a combination of TiCl$_4$ and Ti(OBu)$_4$, to form reaction product "B". Reaction product "B" which is probably a complex of chlorinated and partially chlorinated metal and titanium compounds. Reaction product "B" can comprise a titanium impregnated MgCl$_2$ support and for example, may possibly be represented by a compound such as (MCl$_2$)$_y$(TiCl$_x$(OR)$_{4-x}$)$_z$. Reaction product "B" can be precipitated as a solid from the catalyst slurry.

The second halogenation/titanation step produces reaction product, or catalyst component, "C" which is also probably a complex of halogenated and partially halogenated metal and titanium compounds but different from "B" and may possibly be represented by (MCl$_2$)$_y$(TiCl$_{x'}$(OR)$_{4-x'}$)$_{z'}$. It is expected that the level of halogenation of "C" would be greater than that of product "B". This greater level of halogenation can produce a different complex of compounds.

The third halogenation/titanation step produces a reaction product, or catalyst component, "D" which is also probably a complex of halogenated and partially halogenated metal and titanium compounds but different from "B" and "C", and may possibly be represented by (MCl$_2$)$_y$(TiCl$_{x''}$(OR)$_{4-x''}$)$_{z''}$. It is expected that the level of halogenation of "D" would be greater than that of product "C". This greater level of halogenation would produce a different complex of compounds. While this description of the reaction products offers the most probable explanation of the chemistry at this time, the invention as described in the claims is not limited by this theoretical mechanism.

Metal dialkyls and the resultant metal dialkoxides suitable for use in the present invention can include any that can be utilized in the present invention to yield a suitable polyolefin catalyst. These metal dialkoxides and dialkyls can include Group IIA metal dialkoxides and dialkyls. The metal dialkoxide or dialkyl can be a magnesium dialkoxide or dialkyl. Non-limiting examples of suitable magnesium dialkyls include diethyl magnesium, dipropyl magnesium, dibutyl magnesium, butylethylmagnesium, etc. Butylethylmagnesium (BEM) is one suitable magnesium dialkyl.

In the process for preparing the Ziegler-Natta catalyst, the metal dialkoxide can be a magnesium compound of the general formula Mg(OR'')$_2$ where R'' is a hydrocarbyl or substituted hydrocarbyl of 1 to 20 carbon atoms.

The metal dialkoxide can be soluble and is typically non-reducing. A non-reducing compound has the advantage of forming MgCl$_2$ instead of insoluble species that can be formed by the reduction of compounds such as MgRR', which can result in the formation of catalysts having a broad particle size distribution. In addition, Mg(OR'')$_2$, which is less reactive than MgRR', when used in a reaction involving chlorination with a mild chlorinating agent, followed by subsequent halogenation/titanation steps, can result in a more uniform product, e.g., better catalyst particle size control and distribution.

Non-limiting examples of species of metal dialkoxides which can be used include magnesium butoxide, magnesium pentoxide, magnesium hexoxide, magnesium di(2-ethylhexoxide), and any alkoxide suitable for making the system soluble.

As a non-limiting example, magnesium dialkoxide, such as magnesium di(2-ethylhexoxide), may be produced by reacting an alkyl magnesium compound (MgRR') with an alcohol (ROH), as shown below. MgRR'+2R''OH→Mg(OR'')$_2$+RH+R'H The reaction can take place at room temperature and the reactants form a solution. R and R' may each be any alkyl group of 1-10 carbon atoms, and may be the same or different. Suitable MgRR' compounds include, for example, diethyl magnesium, dipropyl magnesium, dibutyl magnesium and butyl ethyl magnesium. The MgRR' compound can be BEM, wherein RH and R'H are butane and ethane, respectively.

Any alcohol yielding the desired metal dialkoxide may be utilized. Generally, the alcohol utilized may be any alcohol of the general formula R''OH where R'' is an alkyl group of 2-20 carbon atoms, the carbon atoms can be at least 3, at least 4, at least 5, or at least 6 carbon atoms. Non-limiting examples of suitable alcohols include ethanol, propanol, isopropanol, butanol, isobutanol, 2-methyl-pentanol, 2-ethylhexanol, etc. While it is believed that almost any alcohol may be utilized, linear or branched, a higher order branched alcohol, for example, 2-ethyl-1-hexanol, can be utilized.

The amount of alcohol added can vary, such as within a non-exclusive range of 0 to 10 equivalents, is generally in the range of about 0.5 equivalents to about 6 equivalents (equivalents are relative to the magnesium or metal compound throughout), and can be in the range of about 1 to about 3 equivalents.

Alkyl metal compounds can result in a high molecular weight species that is very viscous in solution. This high viscosity may be reduced by adding to the reaction an aluminum alkyl such as, for example, triethylaluminum (TEAl), which can disrupt the association between the individual alkyl metal molecules. The typical ratio of alkyl aluminum to metal can range from 0.001:1 to 1:1, can be 0.01 to 0.5:1 and also can range from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and can range from 0.1:1 to 1:1.

Agents useful in the step of halogenating the metal alkoxide include any halogenating agent which when utilized in the present invention will yield a suitable polyolefin catalyst. The halogenating step can be a chlorinating step where the halogenating agent contains a chloride (i.e, is a chlorinating agent).

Halogenating of the metal alkoxide compound is generally conducted in a hydrocarbon solvent under an inert atmosphere. Non-limiting examples of suitable solvents include toluene, heptane, hexane, octane and the like. In this halogenating step, the mole ratio of metal alkoxide to halogenating agent is generally in the range of about 6:1 to about 1:3, can be in the range of about 3:1 to about 1:2, can be in the range of about 2:1 to about 1:2, and can also be about 1:1.

The halogenating step is generally carried out at a temperature in the range of about 0° C. to about 100° C. and for a reaction time in the range of about 0.5 to about 24 hours.

The halogenating step can be carried out at a temperature in the range of about 20° C. to about 90° C. and for a reaction time in the range of about 1 hour to about 4 hours.

Once the halogenating step is carried out and the metal alkoxide is halogenated, the halide product "A" can be subjected to two or more halogenating/titanating treatments.

The halogenation/titanation agents utilized can be blends of two tetra-substituted titanium compounds with all four substituents being the same and the substituents being a halide or an alkoxide or phenoxide with 2 to 10 carbon atoms, such as $TiCl_4$ or $Ti(OR'''')_4$. The halogenation/titanation agent utilized can be a chlorination/titanation agent.

The halogenation/titanation agent may be a single compound or a combination of compounds. An active catalyst can be obtained even after the first halogenation/titanation; however, there are desirably at least three halogenation/titanation steps, most desirably three halogenation/titanation steps.

The first halogenation/titanation agent is typically a mild titanation agent, which can be a blend of a titanium halide and an organic titanate. The first halogenation/titanation agent can be a blend of $TiCl_4$ and $Ti(OBu)_4$ in a range from 0.5:1 to 6:1 $TiCl_4/Ti(OBu)_4$, the ratio can be from 2:1 to 3:1 ("OBu" represents butoxide). It is believed that the blend of titanium halide and organic titanate react to form a titanium alkoxyhalide, $Ti(OR)_aX_b$, where OR and X are alkoxide and halide, respectively and a+b is the valence of titanium, which is typically 4.

In the alternative, the first halogenation/titanation agent may be a single compound. Examples of a first halogenation/titanation agent are $Ti(OC_2H_5)_3Cl$, $Ti(OC_2H_5)_2Cl_2$, $Ti(OC_3H_7)_2Cl_2$, $Ti(OC_3H_7)_3Cl$, $Ti(OC_4H_9)Cl_3$, $Ti(OC_6H_{13})_2Cl_2$, $Ti(OC_2H_5)_2Br_2$, and $Ti(OC_{12}H_5)Cl_3$.

The first halogenation/titanation step is generally carried out by first slurrying the halogenation product "A" in a hydrocarbon solvent at room temperature/ambient temperature. Nonlimiting examples of suitable hydrocarbons solvent include heptane, hexane, toluene, octane and the like. The product "A" can be at least partially soluble in the hydrocarbon solvent.

A solid product "B" is precipitated at room temperature following the addition of the halogenation/titanation agent to the soluble product "A". The amount of halogenation/titanation agent utilized must be sufficient to precipitate a solid product from the solution. In general, the amount of halogenation/titanation agent utilized, based on the ratio of titanium to metal, will generally be in the range of about 0.5 to about 5, typically in the range of about 1 to about 4, and can be in the range about 1.5 to about 2.5. An example is $TiCl_4$/titanium (IV) butoxide (TNBT).

The solid product "B" precipitated in this first halogenation/titanation step is then recovered by any suitable recovery technique, and then washed at room/ambient temperature with a solvent, such as hexane. Generally, the solid product "B" is washed until the [Ti] is less than about 100 mmol/L. Within the present invention [Ti] represents any titanium species capable of acting as a second generation Ziegler catalyst, which would comprise titanium species that are not part of the reaction products as described herein. The resulting product "B" is then subjected to a second and third halogenating/titanating steps to produce products "C" and "D". After each halogenating/titanating step the solid product can be washed until the [Ti] is less than a desired amount. For example, less than about 100 mmol/L, less than about 50 mmol/L, or less than about 10 mmol/L. After the final halogenating/titanating step, the product can be washed until the [Ti] is less than a desired amount, for example, less than about 20 mmol/L, less than about 10 mmol/L, or less than about 1.0 mmol/L. It is believed that a lower [Ti] can produce improved catalyst results by reducing the amount of titanium that can act as a second generation Ziegler species. It is believed that a that a lower [Ti] can be a factor in producing improved catalyst results such as a narrower MWD.

The second halogenation/titanation step is generally carried out by slurrying the solid product recovered from the first titanation step, solid product "B", in a hydrocarbon solvent. Hydrocarbon solvents listed as suitable for the first halogenation/titanation step may be utilized. The second and third halogenation/titanation steps can utilize a different compound or combination of compounds from the first halogenation/titanation step. The second and third halogenation/titanation steps can utilize the same agent at a concentration that is stronger than that used in the first halogenation/titanation agent, but this is not a necessity. The second and third halogenating/titanating agents can be a titanium halide, such as titanium tetrachloride ($TiCl_4$). The halogenation/titanation agent is added to the slurry. The addition can be carried out at ambient/room temperature, but can also be carried out at temperatures and pressures other than ambient.

Generally, the second and third halogenation/titanation agents comprise titanium tetrachloride. Typically the second and third halogenation/titanation steps each comprise a titanium to magnesium ratio in a range of about 0.1 to 5, a ratio of about 2.0 can also be used, and a ratio of about 1.0 can be used. The third halogenation/titanation step is generally carried out at room temperature and in a slurry, but can also be carried out at temperatures and pressures other than ambient.

The amount of titanium tetrachloride utilized, or alternate halogenation/titanation agent, may also be expressed in terms of equivalents, an equivalent herein is amount of titanium relative to the magnesium or metal compound. The amount of titanium of each of the second and third halogenating/titanating steps will generally be in the range of about 0.1 to about 5.0 equivalents, can be in the range of about 0.25 to about 4 equivalents, typically is in the range of about 0.3 to about 3 equivalents, and it can be desirable to be in the range of about 0.4 to about 2.0 equivalents. In one particular embodiment, the amount of titanium tetrachloride utilized in each of the second and third halogenation/titanation steps is in the range of about 0.45 to about 1.5 equivalent.

The catalyst component "D" made by the above described process may be combined with an organometallic catalyst component (a "preactivating agent") to form a preactivated catalyst system suitable for the polymerization of olefins. Typically, the preactivating agents which are used together with the transition metal containing catalyst component "D" are organometallic compounds such as aluminum alkyls, aluminum alkyl hydrides, lithium aluminum alkyls, zinc alkyls, magnesium alkyls and the like. Preferably, the preactivating agent is selected from the group consisting of trialkylaluminums, dialkylaluminum halides, and alkylaluminum dihalides.

The preactivating agent is preferably an organoaluminum compound. The organoaluminum preactivating agent is typically an aluminum alkyl of the formula $AlR_3$ wherein at least one R is an alkyl having 1-8 carbon atoms or a halide, and wherein each of the R may be the same or different. Suitable preactivating agents include trialkyl aluminum such as, for example, trimethyl aluminum (TMA), triethylaluminum (TEAL), triisobutylaluminum (TIBAL) and also include diethylaluminum chloride, triisobutylaluminum chloride, butylaluminum dichloride, and the like, and mixtures thereof. The organoaluminum preactivating agent is more preferably trimethyl aluminum (TMA), triethyl aluminum (TEAL), triisobutyl aluminum (TIBAL) or mixtures thereof. Preferably, the preactivating agent is TEAL, since with TEAL the molecular weight distribution (MWD) of the bimodal polyethylene prepared in the two reactors in series is even wider than when using other organoaluminum preactivating agents. Generally, when using TEAL as the preactivating agent the MWD will be at least 5, preferably at least 6.

In general, the ratio of Al to titanium can be in the range from 0.1:1 to 2:1 and typically is 0.25:1 to 1.2:1.

Optionally, the Ziegler-Natta catalyst may be pre-polymerized. Generally, a prepolymerization process is affected by contacting a small amount of monomer with the catalyst after the catalyst has been contacted with the preactivating agent. A prepolymerization process is described in U.S. Pat. Nos. 5,106,804; 5,153,158; and 5,594,071, hereby incorporated by reference.

Optionally, an electron donor may be added with the halogenation agent, the first halogenation/titanation agent, or the subsequent halogenation/titanation agent or agents. It may be desirable to have an electron donor utilized in the second halogenation/titanation step. Electron donors for use in the preparation of polyolefin catalysts are well known, and any suitable electron donor may be utilized in the present invention that will provide a suitable catalyst. Electron donors, also known as Lewis bases, are organic compounds of oxygen, nitrogen, phosphorus, or sulfur which can donate an electron pair to the catalyst.

The electron donor may be a monofunctional or polyfunctional compound, can be selected from among the aliphatic or aromatic carboxylic acids and their alkyl esters, the aliphatic or cyclic ethers, ketones, vinyl esters, acryl derivatives, particularly alkyl acrylates or methacrylates and silanes. An example of a suitable electron donor is di-n-butyl phthalate. A generic example of a suitable electron donor is an alkylsilylalkoxide of the general formula $RSi(OR')_3$, e.g., methylsilyltriethoxide [$MeSi(OEt)_3$], where R and R' are alkyls with 1-5 carbon atoms and may be the same or different. ("OEt" represents "ethoxy")

An internal electron donor can be used in the synthesis of the catalyst and an external electron donor or stereoselectivity control agent (SCA) to activate the catalyst at polymerization.

An internal electron donor may be used in the formation reaction of the catalyst during the halogenation or halogenation/titanation steps. Compounds suitable as internal electron donors for preparing conventional supported Ziegler-Natta catalyst components include ethers, diethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate.

External donors which may be utilized in the preparation of a catalyst according to the present invention include organosilane compounds such as alkoxysilanes of general formula $SiR_m(OR')_{4-m}$, where R is selected from the group consisting of an alkyl group, a cycloalkyl group, an aryl group and a vinyl group; R' is an alkyl group; and m is 0-3, wherein R may be identical with R'; when m is 0, 1 or 2, the R' groups may be identical or different; and when m is 2 or 3, the R groups may be identical or different.

The external donor of the present invention can be selected from a silane compound of the following formula: wherein $R_1$ and $R_4$ are both an alkyl or cycloalkyl group containing a primary, secondary or tertiary carbon atom attached to the silicon, $R_1$ and $R_4$ being the same or different; $R_2$ and $R_3$ are alkyl or aryl groups. $R_1$ may be methyl, isopropyl, cyclopentyl, cyclohexyl or t-butyl; $R_2$ and $R_3$ may be methyl, ethyl, propyl, or butyl groups and not necessarily the same; and $R_4$ may also methyl, isopropyl, cyclopentyl, cyclohexyl or t-butyl. Specific external donors are cyclohexylmethyldimethoxy silane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS).

The Polymerisation Process

The invention is a process for polymerizing ethylene in the presence of a Ziegler-Natta catalyst system in at least two slurry loop reactors connected in series, preferably two slurry loop reactors, more preferably two liquid full slurry loop reactors (e.g. a double loop reactor).

This is different from other slurry processes, such as continuously stirred tank reactors (CSTR).

The difference between continuously stirred tank reactors (CSTR) and slurry loop reactors is that since the temperature and pressure in a CSTR is inherently much lower (it is much easier to control the exothermic reaction and to cool the reaction medium), a much larger molecular weight distribution can be obtained (the lower the polymerisation temperature, the larger the molecular weight distribution). In slurry loop reactors, the challenge was to find other means to increase the molecular weight distribution whilst maintaining the other polyethylene properties by other means than temperature. This was made possible with the polymerisation process of the present invention.

It is desirable to make a broad molecular weight distribution in each of the slurry loop reactors. Preferably, the molecular weight distribution of the polyethylene prepared in each reactor is greater than 5.0. By producing different fractions/populations of polyethylene with different weight average molecular weights in each reactor, a bimodal molecular weight distribution can be achieved (this can be observed by two peaks in a GPC curve or by a broadened curve). This is readily achieved with Ziegler-Natta catalysts, preferably with small particular size distribution d50; in contrast, many single-site catalysts, including metallocenes, give polyethylenes with narrower molecular weight distributions.

Optionally, hydrogen is used in the process of the invention to regulate polyolefin molecular weight and melt flow, as is known in the art. The amount of hydrogen needed depends upon the desired polyolefin molecular weight and melt flow properties. Generally, as the amount of hydrogen is increased, the polyolefin molecular weight decreases and the melt index increases. For many applications, the polyolefin melt index will be too low if the polymerization is performed in the absence of hydrogen. The process provides good control of molecular weight and melt flow properties by use of small amounts of hydrogen.

Optionally, ethylene is copolymerized with an α-olefin. Preferred α-olefins are propylene, 1-butene, 1-hexene, 1-octene, and mixtures thereof. The α-olefin, if present, can be used in either or both of the two polymerisation reactors. The amount of α-olefin comonomer is used to regulate density as is well-known in the art.

The polymerizations are normally conducted under pressure. The pressure is preferably in the range of about 0.5 MPa to about 35 MPa, more preferably from about 5 MPa to about 25 MPa.

Ethylene is polymerized in at least two slurry loop reactors in series, preferably two liquid full slurry loop reactors. The polymerization can be performed over a wide temperature range. Generally, lower temperatures give higher molecular weight and longer catalyst lifetimes. However, because the polymerization is exothermic, lower temperatures are more difficult and costly to achieve. A balance must be struck between these two factors. Preferably, the temperature is within the range of at least 85° C., more preferably from 87 to 110° C., most preferably 90 to 100° C.

Catalyst concentrations depend on many factors. Preferably, however, the concentration ranges from about 0.01 micromoles per liter to about 100 micromoles per liter.

Polymerization times depend on the type of process, the catalyst concentration, and other factors. Generally, polymerizations are complete within several seconds to several hours.

The process polymerizes ethylene in at least two slurry loop reactors, connected in series. Two reactors in series give good mixing of the two polyethylenes having different molecular weights. In one of the reactors the low weight average molecular weight (LMW) polyethylene fraction is formed. In the other reactor the high weight average molecular weight (HMW) polyethylene fraction is formed. 30 to 47 wt %, more preferably 36 to 46 wt %, even more preferably 38 to 45 wt %, most preferably 40 to 44 wt % based on the total weight of the bimodal polyethylene is of the HMW polyethylene fraction. The Charpy impact resistance is improved by decreasing the percentage of HMW fraction to preferably between 36 to 46, more preferably 38 to 42 wt % of the polyethylene resin.

The $M_w$ in each of the zones can be regulated by known techniques such as choice of catalyst, reactor temperature, and amount of hydrogen used. While preferably the HMW polyethylene fraction is produced in the first reactor and the LMW polyethylene fraction is produced in the second reactor, the opposite order is also possible. That is, the lower molecular weight polyethylene can also be produced in the first of the two reactors connected in series.

The polymerization process is carried out in at least two reactors, of which at least two are slurry loop reactors. The polymerisation processes in other reactors may be carried out, for example, in the slurry (e.g. continuously stirred tank reactor or loop reactor), bulk or gas phase (e.g. fluidised bed reactor), but preferably in the slurry phase i.e. in further slurry reactors, more preferably in slurry loop reactors, all connected to each other in series More preferably the process is carried out in two slurry loop reactors, most preferably liquid full slurry loop reactors. An example of a double loop process that can be used in the present invention is a double loop system in which one of the loops produces a polymerization reaction in which the resulting polyolefin has a different MW than the polyolefin produced from the polymerization reaction of the other loop, thereby producing a resultant resin having a bimodal molecular weight distribution, as explained above.

Polymerization conditions (e.g. temperature and pressure) are dependent upon the type of equipment utilized in the polymerization process, as well as the type of polymerization process utilized, and are known in the art. Generally, the temperature will be in a range of about 50-110° C., and the pressure in a range of about 10-800 psi.

The activity of the resulting catalyst of the present invention is at least partially dependent upon the polymerization process and conditions, such as, for example, equipment utilized and temperature of reaction. For example in the embodiment of polymerization of ethylene to produce polyethylene, generally the catalyst will have an activity of at least 5,000 g PE/g catalyst but can have an activity of greater than 50,000 g PE/g catalyst, and the activity may be greater than 100,000 g PE/g catalyst.

Additionally, the resulting catalyst of the present invention can provide a polymer with improved fluff morphology due to smaller particle sizes. Thus, the catalyst of the present invention can provide for large polymer particles with a uniform distribution of sizes, wherein fine particles (less than about 63 microns) are only present in low concentrations, such as for example, less than 2% or less than 1%. The catalysts of the present invention, which include large, readily transferred powders with high powder bulk densities, are amenable to polymerization production processes. Generally the catalysts of the invention provide polymer with fewer fines and higher bulk densities (B.D.) wherein the B.D. value can be greater than about 0.31 g/cc, can be greater than about 0.33 g/cc, and can even be greater than about 0.35 g/cc.

The olefin monomer may be introduced into the polymerization reaction zone in a diluent that is a nonreactive heat transfer agent that is a liquid at the reaction conditions. Examples of such a diluent are hexane and isobutane. Optionally the olefin may be copolymerised with a comonomer, such as with another alpha-olefin, such as, for example, propylene, butene or hexane. In such a case, the second alpha-olefin may be present at 0.01-20 mole percent, and can be present at between about 0.02-10 mole percent.

In a slurry polymerization, solid polyethylene is formed in a diluent i.e. the slurry comprises solid polyethylene particles suspended in a liquid, inert diluent. The polyethylene is insoluble under the polymerization conditions.

The process according to the invention covers a polyethylene resin obtained, having a density of at least 0.935 g/cm$^3$ up to 0.960 g/cm$^3$, preferably at least 0.945 g/cm$^3$, more preferably at least 0.955 g/cm$^3$, most preferably of from 0.950 to 0.957 g/cm$^3$. The density can be regulated by the amount of α-olefin used. As the amount of α-olefin is increased, the density decreases.

HLMI of the polyethylene resin ranges from 1 to 100, preferably 1 to 15 g/10 min, more preferably 1 to 10 g/10 min, most preferably 1 to 8 g/10 min.

The polyethylene resin has a bimodal molecular weight distribution (MWD). The MWD is at least 7.0, preferably at least 10.0, more preferably at least 15.0 wide.

In one reactor 30 to 47 wt %, preferably 32 to 46 wt %, more 34 to 45 wt %, most preferably 36 or 38 or 40 to 44 wt %, based on the total weight of the polyethylene resin of a high molecular weight (HMW) polyethylene fraction is produced. The reduced amount of the HMW with respect to the prior art, also helps in increasing the extrudate swell.

This HMW fraction has a high load melt index HL275 of from 0.05 to 1.8 g/10 min, preferably 0.2 to 1 g/10 min, more preferably 0.3 to 0.8 g/cm$^3$, a density of from 0.925 to 0.942 g/cm$^3$, preferably 0.930 to 0.940 g/cm$^3$ and an MWD of at least 5.0. Preferably this occurs in the first reactor. The high load melt index HLMI can be calculated from the measured high load melt index HL275:

$$HLMI=HL275/3.2$$

In the other reactor a low molecular weight (LMW) polyethylene fraction is produced having an HLMI of from 10 to 1500 g/10 min, preferably 30 to 500 g/10 min, more preferably 50 to 300 g/10 min, and a density of from 0.960 to 0.975 g/cm$^3$, preferably 0.962 to 0.973 g/cm3. Preferably this occurs in the second reactor.

The HLMI and density of the fraction in the second reactor were determined using the following formula:

$$\text{Log HLMI}_{final}=\text{wt \%}_{1st}\times\text{Log HLMI}_{1st}+\text{wt \%}_{2nd}\times\text{Log HLMI}_{2nd}$$

$$\text{density}_{final}=\text{wt \%}_{1st}\times\text{density}_{1st}+\text{wt \%}_{2nd}\times\text{density}_{2nd}$$

wherein
"final" means "of the polyethylene resin"
"1st" means "of the polyethylene fraction produced in the first reactor"
"2nd" means "of the polyethylene fraction produced in the second reactor, downstream of the first reactor"

Density was measured according to ASTM 1505 at a temperature of 23° C.

HLMI was measured according to ASTM D 1238 at a temperature of 190° C. and under a load of 21.6 kg.

HL275 was measured according to ASTM D 1238 at a temperature of 190° C. and under a load of 21.6 kg, except that a die of 2.75 mm broad instead of 2.05 mm was used. HL275 can be converted to HLMI according to the following formula:

$$HLMI=HL275/3.2$$

The swell % was measured on a Gottfert 2002 capillary rheometer according to ISO11443:2005 with the proviso that the extruded samples were 10 cm long instead of 5 cm long. The capillar corresponds to a die having an effective length of 10 mm, a diameter of 2 mm and an aperture of 180°. The temperature is 210° C.

Charpy Impact resistance was measured according to ISO 179-1 at –30° C.

ESCR 10 was measured according to ASTM D 1693 using 10% Antarox as a chemical agent.

MWD was measured as Mw/Mn (weight average molecular weight/number average molecular weight) determined by GPC analysis.

Perhaps also more specific ranges for each blow-moulding application:

For use in preparing jerrycans, the polyethylene resin preferably has
   a density of from 0.950 to 0.960 g/cm3, preferably about 0.955 g/cm$^3$
   an HLMI of from 5 to 15 g/10 min, preferably 5 to10 g/10 min
   MWD of at least 7.0, preferably at least 10
   HMW of from 42 to 47 wt %, preferably 44 to 46 wt %, more preferably 44 to 45 wt %

For use in preparing open-head drums, the polyethylene resin preferably has
   a density of from 0.950 to 0.960 g/cm3, preferably about 0.955 g/cm$^3$
   an HLMI of from 4 to 12 g/10 min, preferably 4 to 10 g/10 min
   MWD of at least 7.0, preferably at least 10
   HMW of from 42 to 47 wt %, preferably 44 to 46 wt %, more preferably 44 to 45 wt %

For use in preparing tight-head drums, the polyethylene resin preferably has a Charpy Impact resistance measured according to ISO 179-1 at –30° C. of at least 55 kJ/m$^2$, and preferably
   a density of from 0.950 to 0.960 g/cm$^3$, preferably 0.952 to 0.957, more preferably about 0.955 g/cm$^3$
   an HLMI of from 1 to 4 g/10 min, preferably 2 to 3 g/10 min
   MWD of at least 7.0, preferably at least 10
   HMW of from 30 to 42 wt %, preferably 38 to 41 wt %, more preferably 39 to 40 wt %

For use in preparing fuel tanks, the polyethylene resin preferably has
   a density of from 0.945 to 0.957 g/cm$^3$, preferably greater than 0.950 g/cm$^3$
   an HLMI of from 4 to 10 g/10 min, preferably 5 to 10 g/10 min
   MWD of at least 7.0, preferably at least 10
   HMW of from 42 to 47 wt %, preferably 44 to 46 wt %, more preferably 44 to 45 wt %

Polyethylene produced using the above-mentioned process has a high swell, also referred to herein as extrudate swell, measured as percentage swell. The swell is measured on a Gottfert 2002 capillary rheometer according to ISO11443:2005 with the proviso that the extruded samples were 10 cm long instead of 5 cm long. The method involves measuring the diameter of the extruded product at different shear velocities. The capillary selection corresponds to a die having an effective length of 10 mm, a diameter of 2 mm and an aperture of 180°. The temperature is 210° C. Shear velocities range from 7 to 715 s$^{-1}$, selected in decreasing order in order to reduce the time spent in the cylinder; 7 velocities are usually tested. When the extruded product has a length of about 10 cm, it is cut, after the pressure has been stabilised and the next velocity is selected. The extruded product (sample) is allowed to cool down in a rectilinear position.

The diameter of the extruded product is then measured with an accuracy of 0.01 mm using a vernier, at 2.5 cm ($d_{2.5}$) and at 5 cm ($d_5$) from one end of the sample, making at each position $d_{2.5}$ and $d_5$ two measurements separated by an angle of 90°.

The diameter $d_o$ at the one end of the sample selected for the test is extrapolated:

$$d_o=d_{2.5}+(d_{2.5}-d_5)$$

The swell G is determined as $$G=100\times(d_o-d_f)/d_f$$

wherein $d_f$ is the die diameter.

The test is carried out only on the samples that are free of melt fracture.

The swell value is measured for each of the selected shear velocities and a graph representing the swell as a function of shear velocity can be obtained.

The polyethylene resin according to the invention preferably has a swell percentage of at least 43%, more preferably at least 50% at a shear rate of 71.3 s$^{-1}$.

Blow-Moulding Applications

The polyethylene resins produced in accordance with the above-described processes have physical properties (high extrudate swell) making them particularly suitable for use as blow moulding grade polyethylenes.

The blow-moulded articles are generally use to make containers such as jerrycans including closed and open-top drums, intermediate bulk containers (IBC), tight-head drums and fuel tanks.

The resins according to the invention are advantageously used for Jerrycans due to the improved swell properties, measured on a Gottfert 2002 capillary rheometer according to ISO 11443:2005 with the proviso that the extruded samples were 10 cm long instead of 5 cm long, as described above.

When using the polyethylene resin of the invention having a higher weight average molecular weight i.e. an HLMI of between 1 to 4 g/10 min the resin becomes particularly suitable for blow-moulded tight-head drums due to both the improved swell properties measured as described above and improved Charpy Impact resistance properties of at least 55 kJmol$^{-1}$, measured according to ISO 179-1 at −30° C.

When using the polyethylene resin of the invention having a lower weight average molecular weight i.e. an HLMI of greater than 4, an HMW fraction of 42 to 47 wt % and a density less than 0.957 g/cm3, the resin becomes particularly suitable for fuel tanks due to improved swell properties, sufficient Charpy Impact resistance properties, measured as described above and an improved ESCR, measured according to ASTM D 1693.

The polyethylene resins of the present invention are used preferably for producing containers of a capacity ranging from 0.1 L to 1000 L, preferably 1 to 1000 L.

The blow moulding machine, incorporating a die for extruding a parison to be blow moulded, can be any one of the machines generally used for blow moulding.

It is also possible to produce coextruded plastic containers i.e. multi-layered blow-moulded articles wherein at least one of the layers is prepared with a Ziegler-Natta produced polyethylene according to the invention.

EXAMPLES

Synthesis of a Catalyst Z used According to the Invention

The catalyst was produced according to the following procedure, wherein TEAl is the preactivating agent:

Step 1. BEM/TEAl (1:0.03)+2-ethylhexanol (2-EtOH)→ Mg(2-EtO)$_2$
Step 2. Mg(2-EtO)$_2$+ClTi(OiPr)$_3$→product A
Step 3. Product A+2TiCl$_4$/titanium (IV) butoxide (TNBT)→ product B
Step 4. Product B+TiCl$_4$→Product C
Step 5. Product C+TiCl$_4$→Product D
Step 6. Product D+TEAl→Ziegler Natta catalyst system Z
("OiPr" represents "isopropoxide")

The catalyst system Z has a catalyst particle size distribution d50 of about 6 μm as measured by laser diffraction analysis on a Malvern type analyser (e.g. Malvern 2000S) after having put the catalyst in suspension in cyclohexane. The particle size distribution d50 is defined as the particle size for which fifty percent by volume of the particles has a size lower than the d50.

Polymerisation

Table I displays various polyethylene resins B to E according to the invention obtained from a double loop reactor wherein the HMW fraction was obtained from the first reactor and the LMW fraction was obtained from the second reactor.

Sample A is a comparative example using a Ziegler-Natta catalyst.

Samples B, C, D and E are examples using the catalyst Z prepared as described above, wherein the MWD of the HMW was greater than 5.

The HLMI and density of the fraction in the second reactor were determined using the following formula:

$$\text{Log HLMI}_{final} = \text{wt \%}_{1st} \times \text{Log HLMI}_{1st} + \text{wt \%}_{2nd} \times \text{Log HLMI}_{2nd}$$

$$\text{density}_{final} = \text{wt \%}_{1st} \times \text{density}_{1st} + \text{wt \%}_{2nd} \times \text{density}_{2nd}$$

wherein
"final" means "of the polyethylene resin"
"1st" means "of the polyethylene fraction produced in the first reactor"
"2nd" means "of the polyethylene fraction produced in the second reactor, downstream of the first reactor"

TABLE I

| | Sample | | | | |
|---|---|---|---|---|---|
| | A | B (Jerrycan resin) | C (tight-head resin) | D (fuel tank resin) | E (Jerrycan and open-head resin |
| Catalyst | Comparative Ziegler-Natta | Z | Z | Z | Z |
| Activating agent | TIBAl | TEAl | TEAl | TEAl | TEAl |
| Temperature (in both reactors) | NA | 95° C. | 87° C. | 87° C. | 95° C. |
| Pressure (in both reactors) | NA | ~45 bar | ~45 bar | ~45 bar | ~45 bar |
| Density g/cm$^3$ | 0.955 | 0.955 | 0.955 | 0.952 | 0.955 |
| HLMI g/10 min | 6 | 8 | 3 | 8 | 5 |
| MWD | 18 | 17.4 | 13.5 | 17.5 | 18.6 |
| Mz/Mw | 6.1 | 8.5 | 7.9 | 8.5 | 8.4 |
| HMW fraction wt % | 51 | 46 | 40 | 46 | 44 |
| HMW fraction | | | | | |
| HL275 g/10 min | 0.62 | 0.40 | 0.32 | 0.47 | 0.30 |
| Density g/cm$^3$ | 0.936 | 0.936 | 0.937 | 0.930 | 0.933 |

TABLE I-continued

| | | Sample | | | |
|---|---|---|---|---|---|
| | A | B (Jerrycan resin) | C (tight-head resin) | D (fuel tank resin) | E (Jerrycan and open-head resin |
| LMW fraction | | | | | |
| HLMI g/10 min (as calculated) | 1144 | 440 | 35 | 273 | 113 |
| Density g/cm³ (as calculated) | 0.977 | 0.973 | 0.963 | 0.972 | 0.972 |
| Shear rate s⁻¹ | | | | | |
| Swell % 71.3 | 40.6 | 57.8 | 50.3 | 58 | 52 |
| Charpy Impact at 23° C. kJ/m² | 32 | 40 | 90 | 40 | 41 |
| Charpy Impact at −30° C. kJ/m² | 23 | 28 | 65 | 23 | 30 |
| ESCR 10 (F50) | 1410 | 1200 | 85 | >1300 | 406 |
| FNCT (h) | 14.1 | 22.1 | 10 | 129 | 39.2 |
| Gels | Many gels observed | OK | OK | OK | OK |

Density was measured according to ASTM 1505 at a temperature of 23° C.

HLMI was measured according to ASTM D 1238 at a temperature of 190° C. and under a load of 21.6 kg.

HL275 was measured according to the measurement for HLMI described in ASTM D 1238, also at a temperature of 190° C. and under a load of 21.6 kg, except that a die of 2.75 mm broad instead of 2.05 mm was used.

(HL275 can be converted to HLMI by the following relationship: HLMI=HL275/3.2)

MWD, Mw, Mz and Mn were measured using gel permeation chromatography.

The swell % was measured on a Gottfert 2002 capillary rheometer according to ISO11443:2005 with the proviso that the extruded samples were 10 cm long instead of 5 cm long at 210° C. The capillary had a die having an effective length of 10 mm, a diameter of 2 mm and an aperture of 180°.

Charpy Impact resistance was measured according to ISO 179-1 at −30° C.

ESCR 10 was measured according to ASTM D 1693 using 10% Antarox as a chemical agent.

FNCT (h) was measured according to ISO 16770 using 0.5% Maranyl as a chemical agent.

Thus, by using catalyst Z in two reactors connected in series to prepare a polyethylene having a bimodal molecular weight distribution, an HMW fraction of 46 wt % of the total resin and an HLMI of 8 g/10 min, a resin with improved extrudate swell can be obtained (Sample B). This is particularly useful for producing jerrycans.

By using the same catalyst under the same conditions as for Sample B, but a lower HLMI of 3 g/10 min and an HMW fraction of 40 wt % of the total resin, a resin with improved extrudate swell and improved Charpy Impact resistance can be obtained (Sample C). The resin is particularly useful for producing tight-head Drums. Due to the improved extrudate swell also, a good weld line could be obtained.

By using the same catalyst under the same conditions as Sample B, but at a lower density of from 0.952 g/cm³ having an HMW fraction at 46 wt % of the total resin and an HLMI of 8 g/10 min, a resin with improved extrudate swell, sufficient Charpy Impact resistance and improved ESCR can be obtained (Sample D). The resin is particularly useful for producing fuel tanks.

By using the same catalyst under the same conditions as for Sample B, but a lower HLMI of 5 g/10 min and an HMW fraction of 44 wt % of the total resin, a resin with improved extrudate swell and good Charpy Impact resistance can be obtained (Sample E). The resin is particularly useful for producing Jerrycans and open-head Drums.

Blow Moulding

Sample B was used to prepare a blow-moulded jerrycan. The jerrycan was produced on a Krupp-Kautex KBS 30 blow-moulder with accumulator head and single mould machine adapted for the production of 20 L jerrycans fitted with a standard 135 mm diameter die. The following settings provide acceptable welding line, good wall thickness distribution and good surface aspect:

| | |
|---|---|
| Extruder Settings ° C. | 185-195-200-200-200 |
| Mass temp ° C. | 205 |
| Cycle time | 41 s at 16.1 rpm |
| Head ° C. | 200-200-200 |
| Mass pressure bar | 787 |
| Drop test 1.9 m at −18° C. | OK in all directions |
| Drop test 2.1 m at −18° C. | OK in all directions |
| Top load Fmax kN | 6.5 |

The drop test was carried out according to ISO 16104 (OK=no leakage).

The top load Fmax in kN was measured according to ISO 12048.

Sample C was used to prepare a 220 L tight-head drum. The tight-head drum was produced on a blow-moulder with accumulator head and single mould machine adapted for the production of 220 L tight-head drums fitted with a standard 230 mm diameter die. The following settings provide acceptable welding line, good wall thickness distribution and good surface aspect:

| | |
|---|---|
| Extruder Settings ° C. | 200-215-215-215-215 |
| Mass temp ° C. | 218 |
| Cycle time | 60 s at 29 rpm |
| Head ° C. | 230-230-230-230 |

| | |
|---|---|
| Drop test 1.9 m at −18° C. | OK in all directions |
| Top load Fmax kN | 25.5 |

The drop test was carried out according to ISO 16104 (OK=no leakage).

The top load Fmax in kN was measured according to ISO 12048.

Sample E was used to prepare a 25 L Jerrycan. The jerrycan was produced on a Krupp-Kautex continuous blow-moulder with 2 cavities.

The following settings provide good welding line, good wall thickness distribution and good surface aspect:

| | |
|---|---|
| Extruder Settings ° C. | 190-210-200-200-200 |
| Head ° C. | 210 |
| Die gap mm | 1.265 |
| Drop test 2.5 m at −18° C. | OK in all directions |

With Sample A it was not possible to produce the hereabove mentioned containers i.e. the tight-head drum and the jerrycan using the same machine configuration (the extrudate swell of the comparative Sample A was too low).

What is claimed is:

1. A bimodal polyethylene resin comprising:
   30 to 47 wt % of a high molecular weight (HMW) polyethylene fraction based on a total weight of the polyethylene resin, wherein the HMW polyethylene fraction has an HL275 of from 0.05 to 1.8 g/10 min (HLMI=HL275÷3.2), a density of from 0.925 to 0.942 g/cm$^3$ and an MWD of at least 5.0; and
   a low molecular weight (LMW) polyethylene fraction having an HLMI of from 10 to 1500 g/10 min and a density of from 0.960 to 0.975 g/cm$^3$;
   wherein the bimodal polyethylene resin has a molecular weight distribution MWD of at least 7.0, an HLMI of from 1 to 100 g/10 min, and a density of from 0.935 to 0.960 g/cm$^3$;
   wherein density is measured according to ASTM 1505 at a temperature of 23° C., wherein the HLMI is measured according to ASTM D 1238 at a temperature of 190° C. and under a load of 21.6 kg, and wherein the HL275 is measured according to the measurement of HLMI in ASTM D 1238 at a temperature of 190° C. and under a load of 21.6 kg, except that a die of 2.75 mm broad is used.

2. The bimodal polyethylene resin according to claim 1, wherein the bimodal polyethylene resin is formed by polymerisation of ethylene in at least two slurry loop reactors connected to each other in series;
   wherein the HMW polyethylene fraction is produced in one reactor of the at least two slurry loop reactors;
   wherein the LMW polyethylene fraction is produced in the other reactor of the at least two slurry loop reactors; and
   wherein the bimodal polyethylene resin is formed in the presence of a Ziegler-Natta catalyst system.

3. The bimodal polyethylene resin according to claim 1, wherein the bimodal polyethylene resin has a percentage swell at a shear rate of 71.3 s$^{-1}$ that is at least 43%, wherein the percentage swell is measured on a capillary rheometer according to ISO11443:2005 at a temperature of 210° C., the capillar having an effective die length of 10 mm, a diameter of 2 mm and an aperture of 180°, with the proviso that extruded samples are 10 cm long instead of 5 cm long.

4. The bimodal polyethylene resin according to claim 1, wherein the bimodal polyethylene resin has a percentage swell at a shear rate of 71.3 s$^{-1}$ that is at least 50%, wherein the percentage swell is measured on a capillary rheometer according to ISO11443:2005 at a temperature of 210° C., the capillar having an effective die length of 10 mm, a diameter of 2 mm and an aperture of 180°, with the proviso that extruded samples are 10 cm long instead of 5 cm long.

5. The bimodal polyethylene resin according to claim 1, wherein the bimodal polyethylene resin has a Charpy impact resistance according to ISO 179-1 at −30° C. of at least 55 kJ/m$^2$.

6. The bimodal polyethylene resin according to claim 1, wherein the bimodal polyethylene resin has a density of at least 0.945 g/cm$^3$.

7. The bimodal polyethylene resin according to claim 1, wherein the bimodal polyethylene resin has an HLMI ranging from 1 to 15 g/10 min.

8. The bimodal polyethylene resin according to claim 1, wherein the bimodal polyethylene resin has an MWD of at least 10.0.

9. The bimodal polyethylene resin according to claim 1, wherein the HMW polyethylene fraction has an HL275 of from 0.2 to 1 g/10 min.

10. The bimodal polyethylene resin according to claim 1, wherein the HMW polyethylene fraction has a density of from 0.930 to 0.940 g/cm$^3$.

11. The bimodal polyethylene resin according to claim 1, wherein the LMW polyethylene fraction has an HLMI of from 30 to 500 g/10 min.

12. The bimodal polyethylene resin according to claim 1, wherein the LMW polyethylene fraction has a density of from 0.962 to 0.973 g/cm$^3$.

13. The bimodal polyethylene resin according to claim 1, wherein the HMW polyethylene fraction has an $M_w$ of from 500,000 to 1,000,000 Da.

* * * * *